United States Patent
Ascoli et al.

(10) Patent No.: US 8,190,422 B2
(45) Date of Patent: May 29, 2012

(54) SEMANTIC COGNITIVE MAP

(75) Inventors: Giorgio A. Ascoli, Fairfax Station, VA (US); Alexei Samsonovich, Fairfax, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 1044 days.

(21) Appl. No.: 12/123,812

(22) Filed: May 20, 2008

(65) Prior Publication Data
US 2010/0042401 A1 Feb. 18, 2010

Related U.S. Application Data

(60) Provisional application No. 60/939,069, filed on May 20, 2007.

(51) Int. Cl.
*G06F 17/21* (2006.01)
*G06F 17/20* (2006.01)
*G06F 17/27* (2006.01)

(52) U.S. Cl. .................. 704/9; 704/1; 704/10
(58) Field of Classification Search .......... 704/1–9
See application file for complete search history.

(56) References Cited

U.S. PATENT DOCUMENTS

| 5,794,178 | A  | * | 8/1998  | Caid et al. ............ 704/9  |
| 7,263,509 | B2 | * | 8/2007  | Lee et al. ............ 706/47 |
| 7,403,890 | B2 | * | 7/2008  | Roushar ............ 704/9     |
| 7,519,613 | B2 | * | 4/2009  | Guha et al. ............ 1/1   |
| 7,644,047 | B2 | * | 1/2010  | Assadian et al. ....... 706/1 |
| 7,809,548 | B2 | * | 10/2010 | Mihalcea et al. ...... 704/1  |
| 2003/0226100 | A1 | * | 12/2003 | Farahat et al. ...... 715/500 |
| 2004/0039564 | A1 | * | 2/2004  | Mueller ............ 704/9     |
| 2004/0205038 | A1 | * | 10/2004 | Lee et al. ............ 706/47 |
| 2005/0080613 | A1 | * | 4/2005  | Colledge et al. ...... 704/9  |
| 2005/0278325 | A1 | * | 12/2005 | Mihalcea et al. ...... 707/6  |
| 2006/0009963 | A1 | * | 1/2006  | Gaussier et al. ...... 704/7  |
| 2006/0156253 | A1 | * | 7/2006  | Schreiber et al. ...... 715/835 |
| 2007/0010994 | A1 | * | 1/2007  | Mueller ............ 704/9     |
| 2010/0235165 | A1 | * | 9/2010  | Todhunter et al. ...... 704/9 |

OTHER PUBLICATIONS

Alexei V. Samsonovich and Giorgio A. Ascoli. 2007. Cognitive Map Dimensions of the Human Value System Extracted from Natural Language. In Proceeding of the 2007 conference on Advances in Artificial General Intelligence: Concepts, Architectures and Algorithms: Proceedings of the AGI Workshop 2006, Ben Goertzel and Pei Wang (Eds.). IOS Press, Amsterd.*

Xia Lin, Dagobert Soergel, and Gary Marchionini. 1991. A self-organizing semantic map for information retrieval. In Proceedings of the 14th annual international ACM SIGIR conference on Research and development in information retrieval (SIGIR '91). ACM, New York, NY, USA, 262-269.*

Benjamin Kuipers, The Spatial Semantic Hierarchy, Artificial Intelligence, vol. 119, Issues 1-2, May 2000, pp. 191-233, ISSN 0004-3702, 10.1016/S0004-3702(00)00017-5.*

* cited by examiner

*Primary Examiner* — Vijay B Chawan
*Assistant Examiner* — Michael Ortiz Sanchez
(74) *Attorney, Agent, or Firm* — David Grossman

(57) ABSTRACT

A semantic cognitive map created by associating each of a multitude of dictionary entries with a point among a multitude of points in a metric space, each of the dictionary entries associated with at least one onym, the at least one onym including at least one synonym or antonym, the metric space having a topology and metrics, the location of each of the multitude of points defined by a global minimum of an energy function of the multitude of points.

21 Claims, 15 Drawing Sheets

| PC#: var | Starting from the one end of the list | Starting from the other end of the list |
|---|---|---|
| 1: 2.54 | increase, well, rise, support, accept... | drop, lose, dull, break, poor... |
| 2: 0.95 | calm, easy, soft, gentle, relaxed... | difficult, harsh, hard, trouble, twist... |
| 3: 0.51 | start, open, fresh, begin, release... | close, delay, end, finish, halt... |
| 4: 0.33 | thin, edge, use, length, wet... | center, save, deep, dry, middle... |
| 5: 0.15 | essential, need, poverty, basic, necessary... | back, surplus, later, wealth, unnecessary... |
| 6: 0.13 | pull, private, receive, owe, keep... | dig, push, channel, ditch, national... |
| 7: 0.04 | over, top, on top of, above, impose... | base, under, below, underneath, beneath... |
| 8: 5.6e-8 | old, mature, adult, aged, previous... | young, child, dig, immature, new... |
| 9: 1.7e-9 | normally, carefully, modestly, frequently, often... | unusually, extremely, rarely, strangely, carelessly... |
| 10: 6e-10 | personally, carefully, for myself, amazingly, thoughtfully... | universally, carelessly, normally, generally, usually... |

FIG. 6

| PC#: var | English: 8,236 words total core size | French: translated (87,811 words total core size) |
|---|---|---|
| 1 | increase, well, rise, support, accept, clear, improve, right, continue, direct, good, make, respect, honor, happy, secure, order, understanding, fix, power, bright, present, definite... | happy, agreement, stable, joined together, delighted, approve, net, some, honest, rich, added, increased, pleasant, sincere, union, frank, fix, favor, praise, optimist, accept, abundance, help... |
| 2 | calm, easy, soft, gentle, relaxed, light, ease, simple, quiet, soothe, smooth, empty, mild, weak, gently, peaceful, compliant, lenient, pale... | calm, modest, discrete, simple, subjected, thin, alleviated, softened, flexible, sober, moderate, soft, immobility, measured, silence, humble, reserved, simplicity, obeying... |
| 3 | start, open, fresh, begin, release, original, new, reveal, speed up, free... | release, deliver, freedom, yield, open, leave, free, disencumbered, discovered, dispersion, broad... |

FIG. 8

SEMANTIC COGNITIVE MAP

CROSS-REFERENCE TO RELATED APPLICATIONS

This application claims the benefit of U.S. Provisional Application No. 60/939,069, filed May 20, 2008, entitled "A Semantic Cognitive Map," which is hereby incorporated by reference in its entirety.

STATEMENT REGARDING FEDERALLY SPONSORED RESEARCH OR DEVELOPMENT

This invention was made with government support under IPTO BICA Grant FA8750-05-2-0278 awarded by DARPA/AFRL. The government has certain rights in the invention.

REFERENCE TO COMPUTER PROGRAM LISTING APPENDIX

A portion of the present disclosure is contained in a computer program listing appendix filed electronically herewith as an ASCII text file, which is hereby incorporated by reference in its entirety. The ASCII text file is entitled GMU-07-047U_Appendix.txt created on May 17, 2008, of approximately 15 kilobytes.

BRIEF DESCRIPTION OF THE SEVERAL VIEWS OF THE DRAWINGS

FIG. 6 is a table showing sorted lists for the English core in a ground state.

FIG. 8 is a table showing top portions of sorted lists for each principal component for the top three dimensions for two languages.

DETAILED DESCRIPTION OF EMBODIMENTS

Figure 1:
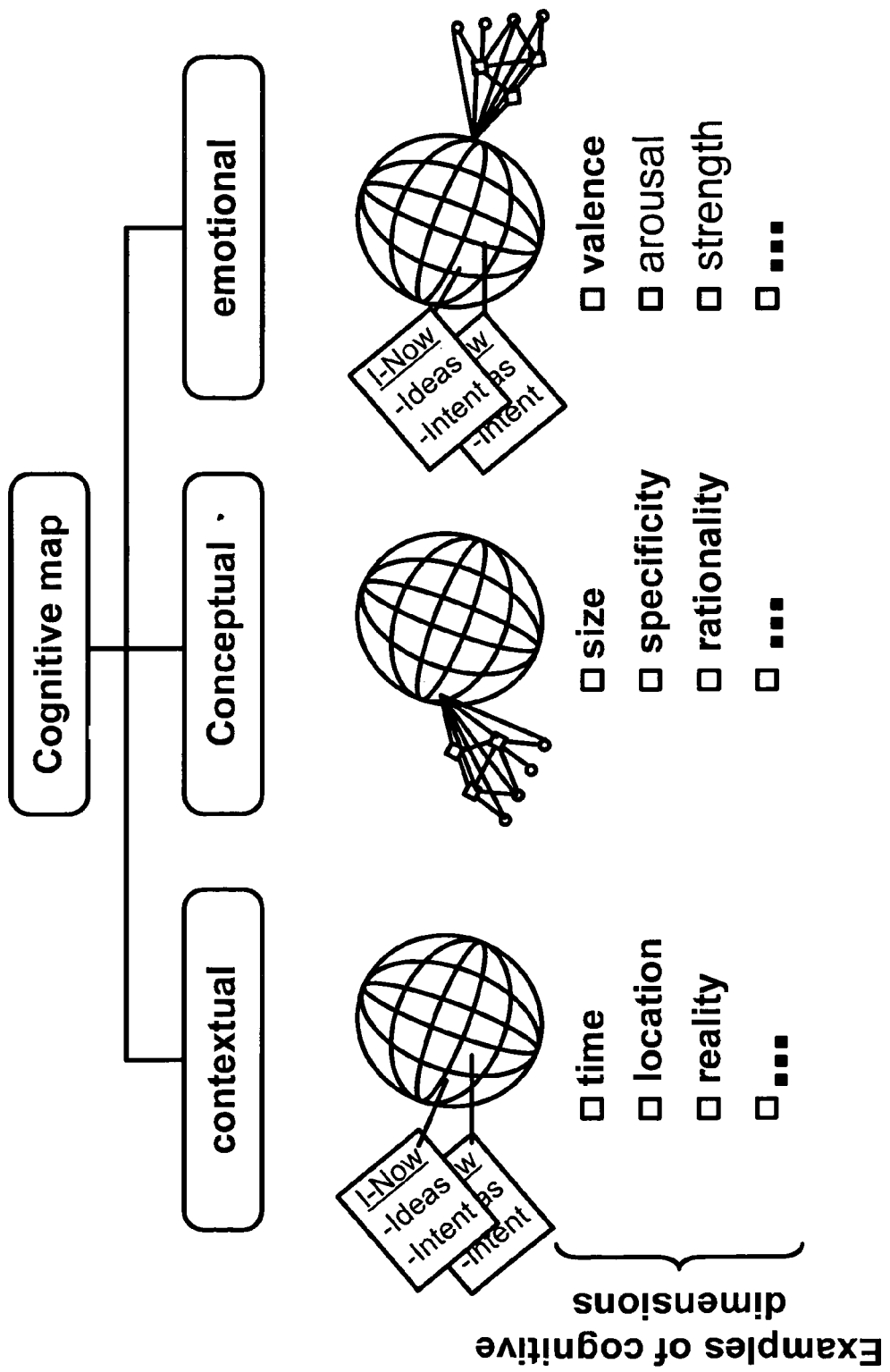
FIG. 1 is a diagram showing cognitive maps as abstract metric spaces that reflect semantics of associated symbolic representations.

Embodiments of the present invention are directed to Symantec cognitive map(s). Specifically, disclosed embodiments include semantic cognitive map of natural language constructed using dictionaries of synonyms and antonyms. Entries from the dictionary are embedded in metric spaces. Semantics of the two most significant dimensions may be approximately characterized using concepts such as "good vs. bad" and "calming vs. exciting." Applications of the semantic cognitive map include: (i) quantitative definitions of universal semantic dimensions and their experimental validation, and (ii) computation of semantic biases and preferences expressed in an arbitrary given text segment: "mood sensing from text". The latter, practically important capability can be used in search engines, in human interfaces of intelligent agents, etc.

The notion of a human value system may be quantified as a cognitive map, the dimensions of which capture the semantics of concepts and the associated values. This may be done, if one knows (i) how to define the dimensions of the map, and (ii) how to allocate concepts in those dimensions. Regarding the first question, experimental studies with linguistic material using psychometrics have revealed that valence, arousal and dominance are primary dimensions characterizing human values. The same or similar dimensions are used in popular models of emotions and affects. In these studies, the choice of principal dimensions, as well as scoring concepts, was based on subjective reports or psycho-physiological measurements.

The presently disclosed embodiments teach how to construct a cognitive map of human values without testing human subjects using generally available dictionaries of synonyms and antonyms. By applying a statistical-mechanic model to English and French dictionaries, example embodiment multidimensional cognitive maps were constructed that capture the semantics of words. Principal dimensions of the resultant maps were calculated. The semantics were found to be consistent across the two languages as well as with previously known main cognitive dimensions. These results suggest that the linguistically derived cognitive map of the human value system is language-invariant and, being closely related to psychometrically derived maps, is likely to reflect fundamental aspects of the human mind.

The term "cognitive map" had been used in cognitive sciences for several decades with various meanings. One notion of a cognitive map was based on the hippocampal place cell phenomenon. This notion was subsequently extended to include cognitive mapping of non-spatial features of contexts and paradigms, based on the spatial analogy.

In the present application, a cognitive map is a mapping from a set of cognitive representations (e.g. concepts, words) to an abstract continuous metric space, such that semantic relations among representations are reflected in geometric relations in the indexing space. This definition unfolds as follows. In a spatial cognitive map, the metrics may be proportional to the perceived distances between associated landmarks in the physical world. In this case, the cognitive map is essentially a model of perceived space. Similarly, a temporal cognitive map, if it were found in the brain as a separate functional unit, would be a model of a perceived timeline. Another example of a cognitive map is a color space, in which locations correspond to perceived colors.

FIG. 1 is a diagram showing cognitive maps as abstract metric spaces that reflect semantics of associated symbolic representations. Different kinds of cognitive maps may represent different aspects of semantics and/or map different kinds of representations. Speaking more generally, various kinds of cognitive maps may be distinguished based on the semantics they represent (logic, values, feelings, qualia) and on the representation systems they map (e.g., one may distinguish contextual and conceptual cognitive maps). Up until now, cognitive maps beyond spatial and temporal dimensions remain unexplored terrain in cognitive neurosciences.

Of interest to some embodiments are a particular kind of cognitive maps called "conceptual value maps." This kind of cognitive map represents dimensions of which captures human values of concepts and may be constructed, if one knows how to define the dimensions of the map and how to allocate concepts in them.

Linguistic corpora may be used as a source of data about the semantics of concepts (represented in disclosed examples by words). Self-organization may help find the principal dimensions and to allocate concepts automatically. The problems of cognitive map creation may be solved in this case using available linguistic data. Therefore, a dictionary of words may be selected as study material, keeping in mind that words represent concepts, and concepts are associated with values.

The idea of applying the notion of a cognitive map to linguistic corpora appears to be unexplored, while multidimensional metrics were used to characterize semantics of words, concepts and feelings in many cognitive studies. Examples include theoretical models of emotions that go along with experimentally derived psychometric dimensions of words. The experimental studies, the choice of principal dimensions, as well as related scoring of concepts, were based on subjective reports or psycho-physiological measurements. However, it is desirable to be able to construct cognitive map of human values without testing human subjects. Disclosed embodiments may be used to create a cognitive map of human values using generally available dictionaries of synonyms and antonyms without further experimentation.

Figure 2:
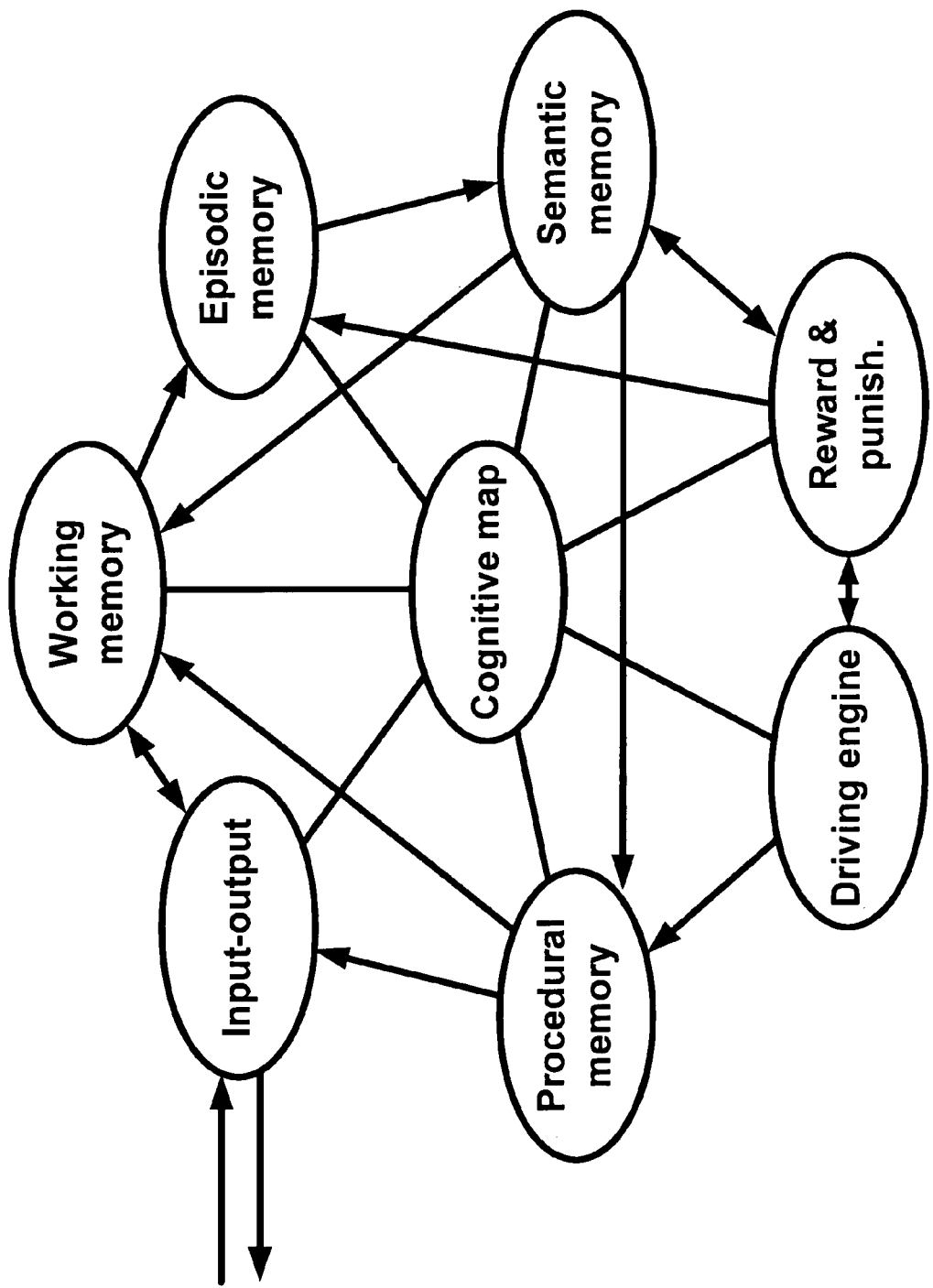
FIG. 2 is a diagram showing a bird view of a cognitive architecture design.

FIG. 2 is a diagram showing a bird view of a Biologically Inspired Cognitive Architecture (BICA) developed for use in artificial general intelligence (AGI). The notion of a cognitive map, however, is not limited to the field of artificial general intelligence (AGI). Information processing in BICA occurs at a higher symbolic level, based on new building blocks called "a schema" and "a mental state." The notion of a schema may be associated with that of a concept, while the notion of a mental state can be associated with that of a context. Multiple instances of schemas and mental states fill in the three main memory systems in BICA: working, semantic and episodic memory. When new information comes to the system through the input-output buffer, it gets represented by instances of schemas. This is done with the help of procedural memory that "knows" what schemas should be used for each given kind of input. The rest of information processing does not have a pre-defined solution and may involve the search of the entire semantic and/or episodic memories at each step. Thus, filtering of the exploding tree of possibilities becomes vital for successful operation of BICA in practical scenarios. This filtering is one of the main functions of neuromorphic cognitive maps in BICA. In general, it can be understood as a task to suggest a preferred choice of a schema that will be used by the architecture at the next step. Filtering by a cognitive map also constrains the semantics of admissible schemas to a narrow domain in the cognitive space. This mechanism could be used, e.g., in analogy search or in classification of memories. Another aspect of the same cognitive map function is evaluation (how good, how plausible, how exciting, etc.) of a given concept. In this sense, cognitive maps provide an otherwise undefined "metric system" in the field. While the cognitive map is expected to develop its metrics through self-organization, the primary values for a limited number of selected concepts need to be provided by an external source. In the case of BICA they are provided by the reward and punishment system.

Materials and Methods

Linguistic corpora: The example embodiment disclosed here was conducted using two linguistic corpora: dictionaries of synonyms and antonyms available as parts of the thesaurus in Microsoft Word 2003 (MS Word). The two corpora apparently have independent origin and different characteristics. The English thesaurus was developed for Microsoft by Bloomsbury Publishing, Plc. and the French thesaurus is copyrighted by SYNAPSE Development, Toulouse, France. The total size of each of them is above 200,000 entries. The core dictionaries used in this embodiment and the corresponding matrices W of synonym-antonym relations were extracted automatically following the procedure described below.

Figure 3A:
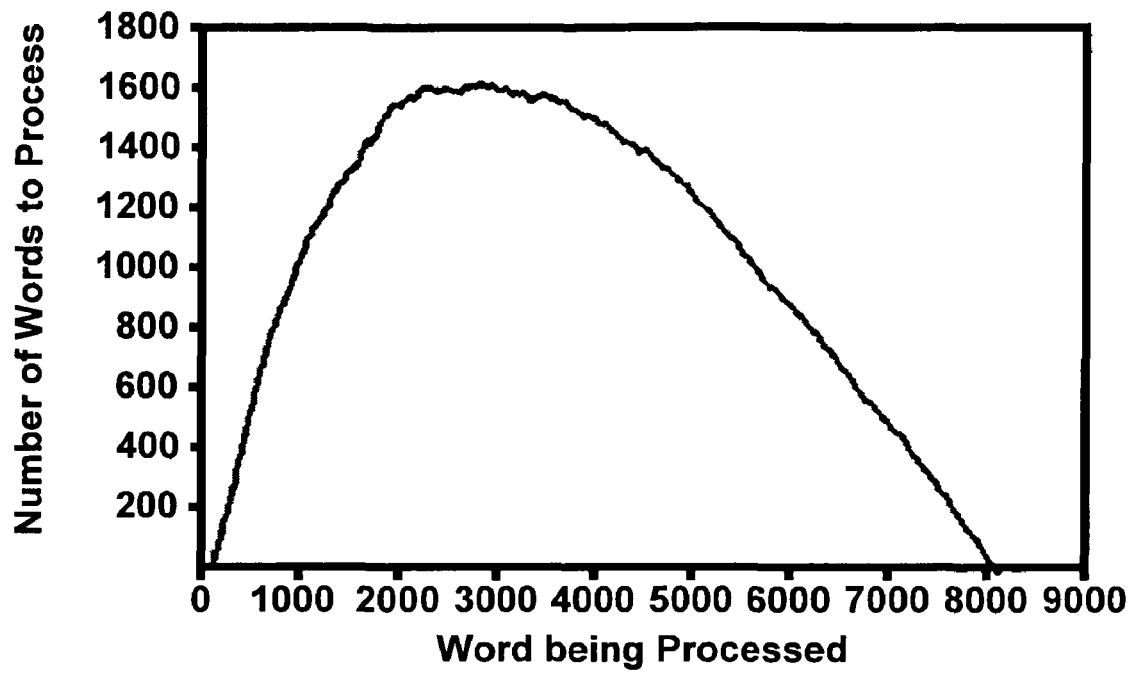
FIG. 3A is a graph showing the extraction of an English dictionary from MS Word.
Figure 3B:
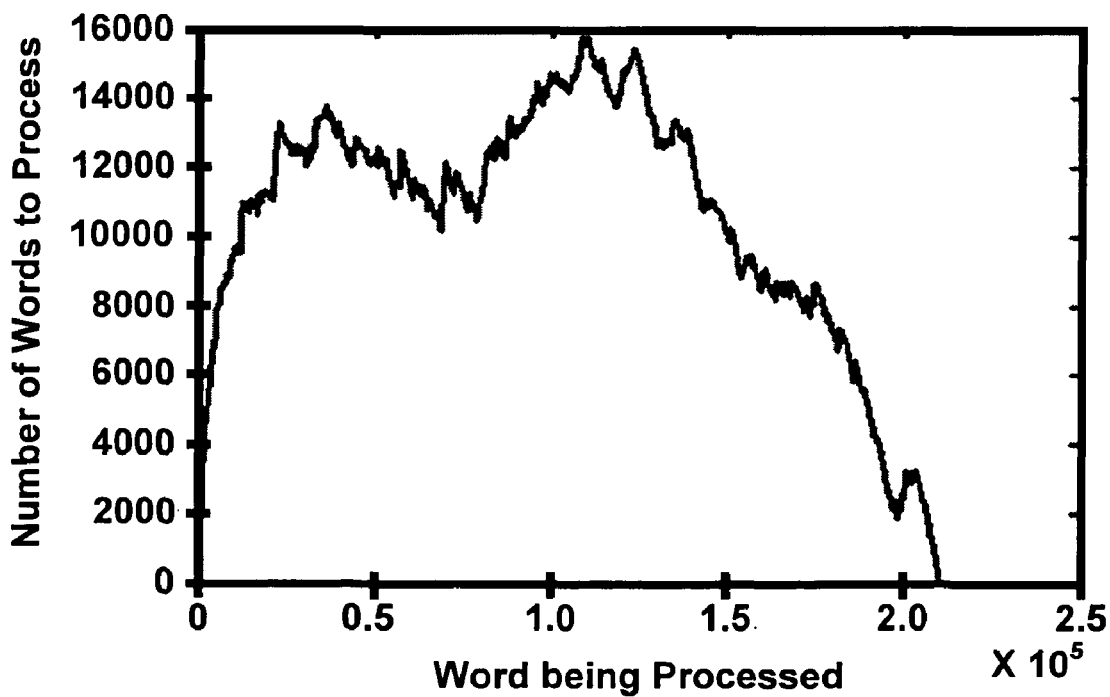
FIG. 3B is a graph showing the extraction of a French dictionary from MS Word.

FIG. 3A is a graph showing the extraction of an English dictionary from MS Word. FIG. 3B is a graph showing the extraction of a French dictionary from MS Word. The abscissa is the word that is being processed and the ordinate is the number of unprocessed words in the retrieved list at the current step.

Extraction of the core dictionary

The following procedure may be used to extract a core dictionary from MS Word:

Step 1: Start with one word in the dictionary. Take the next word from the dictionary. Retrieve its synonyms and antonyms from MS Word. Merge them into the dictionary (avoid repetitions). Repeat until the retrieved dictionary is processed.

Step 2: Eliminate duplicates that were not detected during Step 1. Recursively remove all words with less than two connections (see FIG. 4A). The remainder by definition constitutes the "core" dictionary. Symmetrize the relation matrix W by making all synonym and antonym links bi-directional Symmetrization may be necessary for the energy function (*) to be Hermitean, in which case the relaxation process (**) converges to a fixed point rather than a cycle.

The starting word for English was "first", for French "premier." The resultant sets of words never changed by more than a few words when different starting words were tried.

Characteristics of the core dictionaries

In this example, the extracted English core has 8,236 words. An average word in it has 3.0 synonyms (1.8 before symmetrization) and 1.4 antonyms (0.8 before symmetrization). The extracted French core has 87,811 words. An average word in it has 6.4 synonyms (3.9 before symmetrization) and 7.5 antonyms (3.9 before symmetrization). The total average number of connections (degree) per word is 4.3 for English core and 14.0 for French core. In each case, the extracted core is a small part of the entire thesaurus.

Figure 4A:
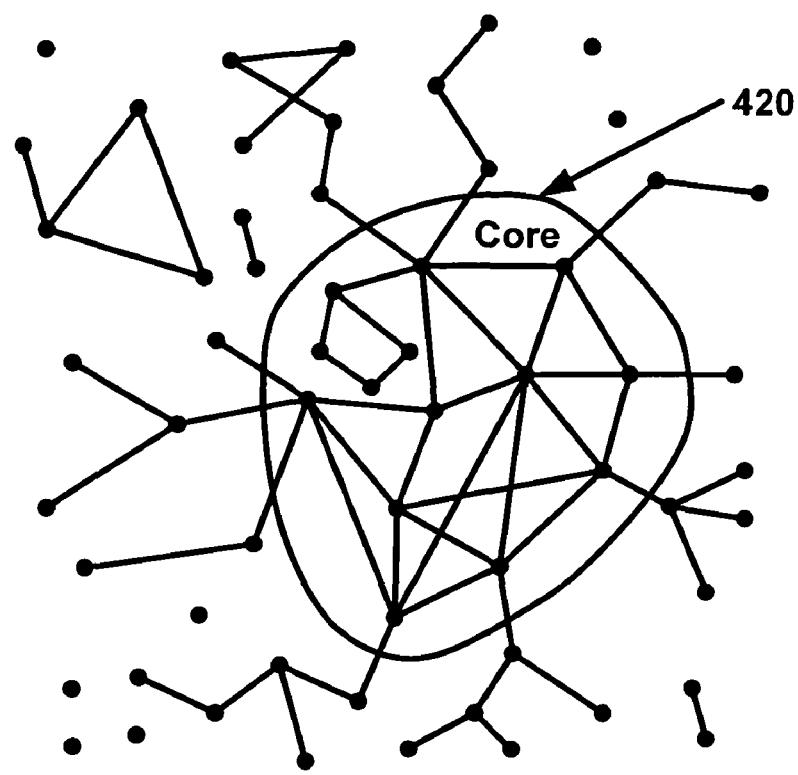
FIG. 4A is a graph of synonym-antonym links for an English core dictionary.
Figure 4B:
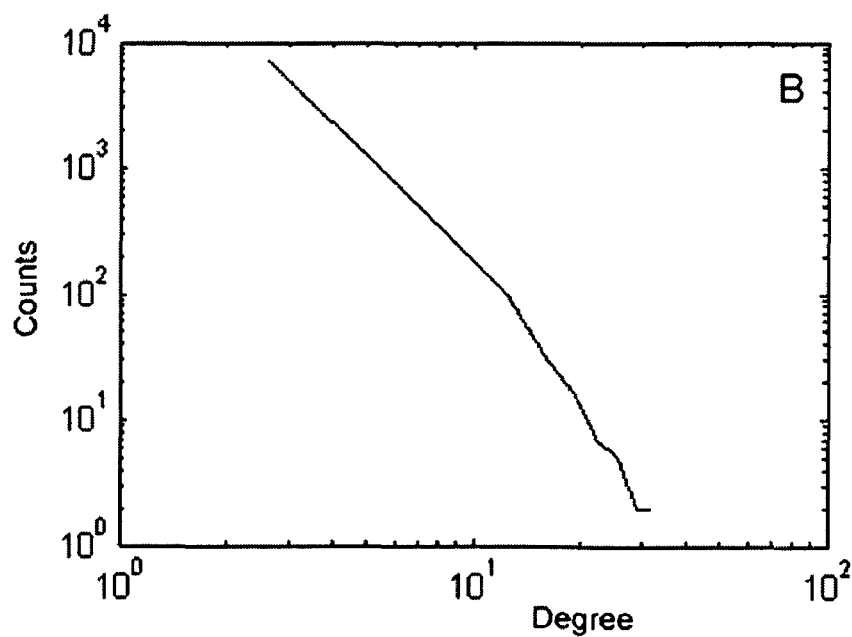
FIG. 4B is a scaling law analysis showing that an extracted English core dictionary forms a nearly scale-free graph.

FIG. 4A is a graph of synonym-antonym links for the English core dictionary generated using post-processing of the extracted dictionary showing the notion of a core dictionary. Only nodes that have at least two connections to other core nodes are left in the core 420. Links are bi-directional and could be synonym-synonym or antonym-antonym connections. FIG. 4B is a scaling law analysis showing that the extracted English core dictionary forms a nearly scale-free graph.

The graph of synonym-antonym links for the English core (shown in FIG 4A) is nearly scale-free, but may not be usable as a cognitive map. For example, considering the graph of English synonyms only, one can see that distances on the graph (measured in the number of links of the shortest path) are semantically misleading:

Average distance between words=6.7
Distance (true, false)=8
Distance (big, small)=5
Distance (happy, satisfaction)=7
Distance (cloth, dress)=5

This happens because only very few of all synonyms and antonyms of a given word are actually listed in the corpus (the graph is very sparse).

Statistical-physics-inspired approach to self-organization of a cognitive map

The idea of constructing a cognitive map by self-organization is to represent the evolving cognitive map by a statistical mechanical model and to find its ground state that is expected to capture the semantics. A set of example actions to accomplish this task include:

1. Randomly allocate N words as particles (vectors) in R100 in a unit ball.

2. Arrange for attraction between synonyms and repulsion among antonyms by defining an energy function of the system based on the relation matrix W:

$$H(x) = -\frac{1}{2}\sum_{i,j=1}^{N} W_{ij} x_i \cdot x_j + \frac{1}{4}\sum_{i=1}^{N} |x_i|^4, \quad (*)$$

$$x \in \mathbb{R}^N \oplus \mathbb{R}^{100}$$

3. Simulate thermodynamical relaxation of the system to its ground state ($10^6$ iterations) based on the following stochastic equation ($\eta$ is a Gaussian noise):

$$\dot{x}_i = -\frac{\partial H}{\partial x_i} + \eta_i(t), \quad (**)$$

$$\langle \eta(t)^2 \rangle \to 0.$$

4. Rotate the resultant distribution in $\mathbb{R}^{100}$ to its principal components (PCs).

5. Identify semantics of the coordinates (PCs) by sorting words along them.

In this example, the symmetric relation matrix W in (*) has "+1" entries for pairs of synonyms and "−1" entries for pairs of antonyms, all other matrix elements are equal to zero. During the construction of W, different forms of the same word may be treated as synonyms. Convergence of (**) to a ground state may be assessed by measuring the maximal displacement of any particle in one step of simulated dynamics.

Psychometric data used in this study

In the analysis of experimental results, the Affective Norms for English Words (ANEW) database developed by the Center for the Study of Emotion and Attention (CSEA) at the University of Florida was used. This database contains 1,034 affective English words. The ANEW database was created using the Self-Assessment Manikin to acquire ratings of "pleasure," "arousal," and "dominance." Each rating scale in ANEW runs from 1 to 9, with a rating of '1' indicating a low value (low pleasure, low arousal, low dominance) and '9' high on each dimension. The ANEW database was kindly provided by Dr. Margaret M. Bradley (University of Florida, CSEA).

Software and hardware

Algorithms were implemented using XEmacs and GNU C on Dell Optiplex GX620 running Fedora Core 5 Linux. Data preparation and analysis were performed using Microsoft Office 2003 Professional Enterprise Edition on Dell Optiplex GX620 running Windows XP Pro, also using Octave and Matlab 7.0.

Results

In all the numerical experiments, $10^6$ iterations (and $10^5$ iterations in most cases) were sufficient for convergence of the system to its ground state (assessed as described above). In the numerical implementation of (**), the time step was $\Delta t=0.001$, the initial noise standard deviation $\langle \eta^2 \rangle^{1/2}$ was 0.5, and its value decreased inversely proportionally with time. Key findings are presented in FIGS. 5-9.

Figure 5A:
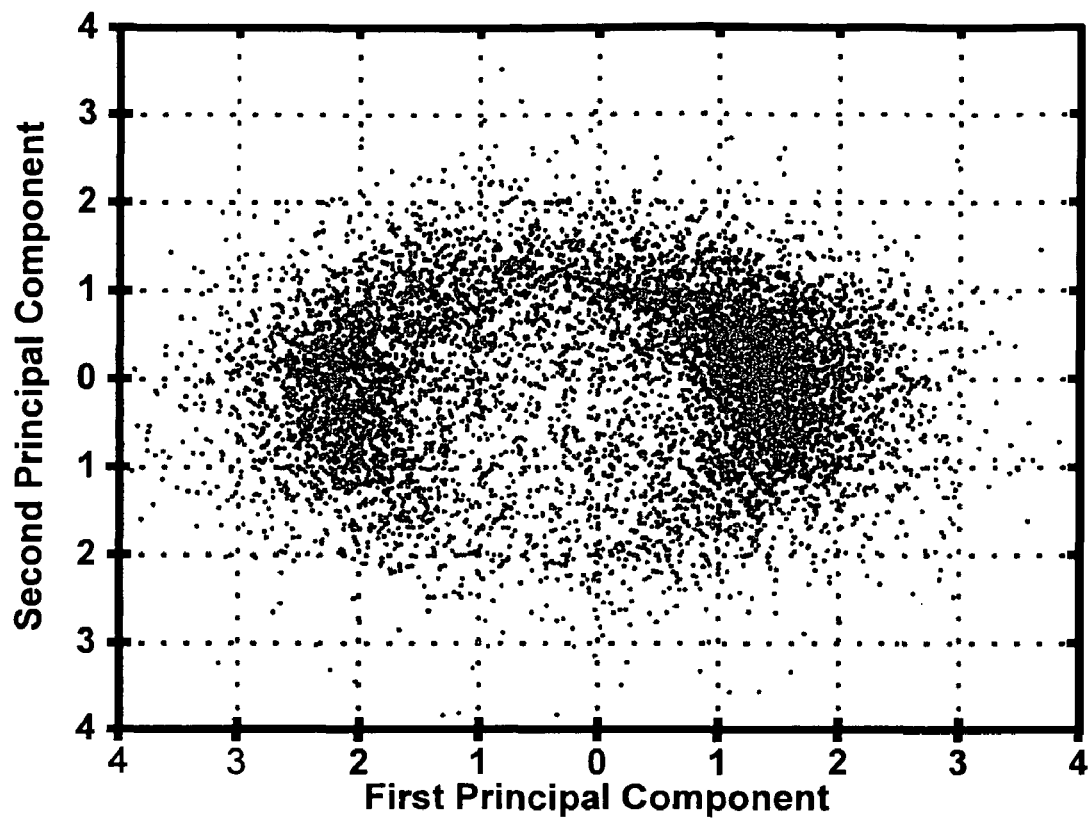
FIG. 5A is a graph showing a final distribution of English words mapped per an aspect of an embodiment of the present invention.
Figure 5B:
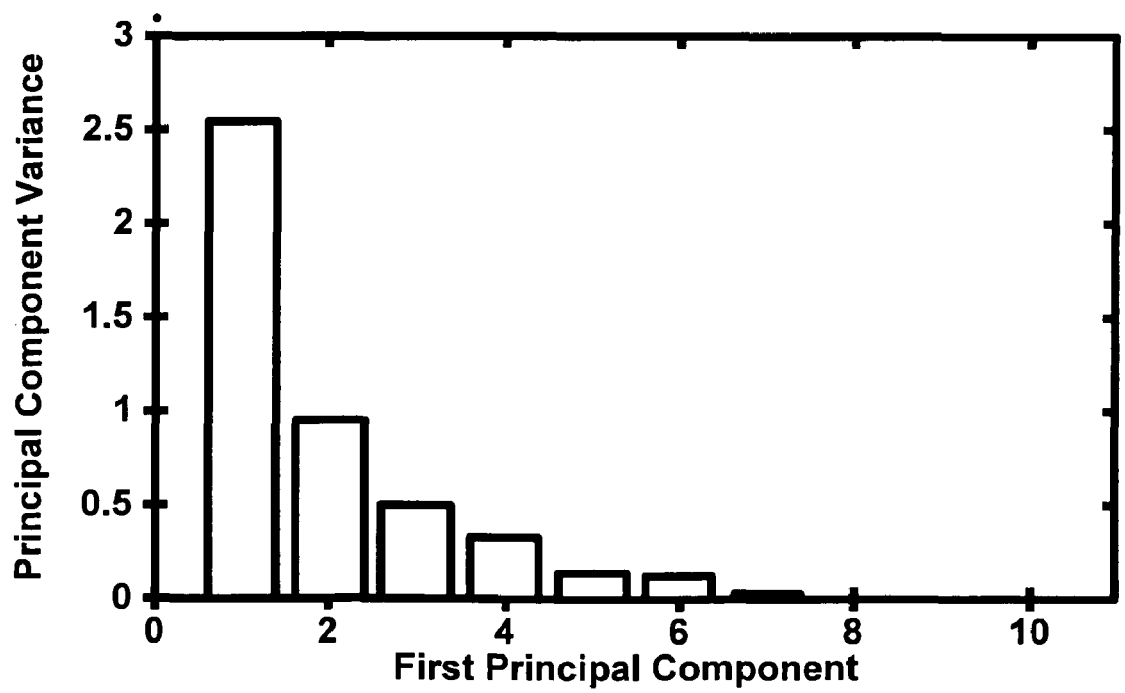
FIG. 5B is a graph showing variances of the first ten principal components shown in FIG. 5C.

FIG. 5A is a graph showing a final distribution of English words. The words come from the English core is in its "ground state." As shown the final distribution takes on a "banana shape" (visible after rotation to PCs). The two fuzzy clusters and the corresponding horizontal dimension separate positive and negative values. The vertical axis corresponds to another cognitive dimension: "calming vs. exciting". D=100, H(x) is given by (*). FIG. 5B is a graph showing variances of the first ten principal components shown in the table in FIG. 6.

FIG. 6 is a table showing sorted lists for the English core in a ground state. There are 10 principal components consisting of 5+5 elements in each list. The number and the variance of each principal component are given in the left column.

Figure 7A:
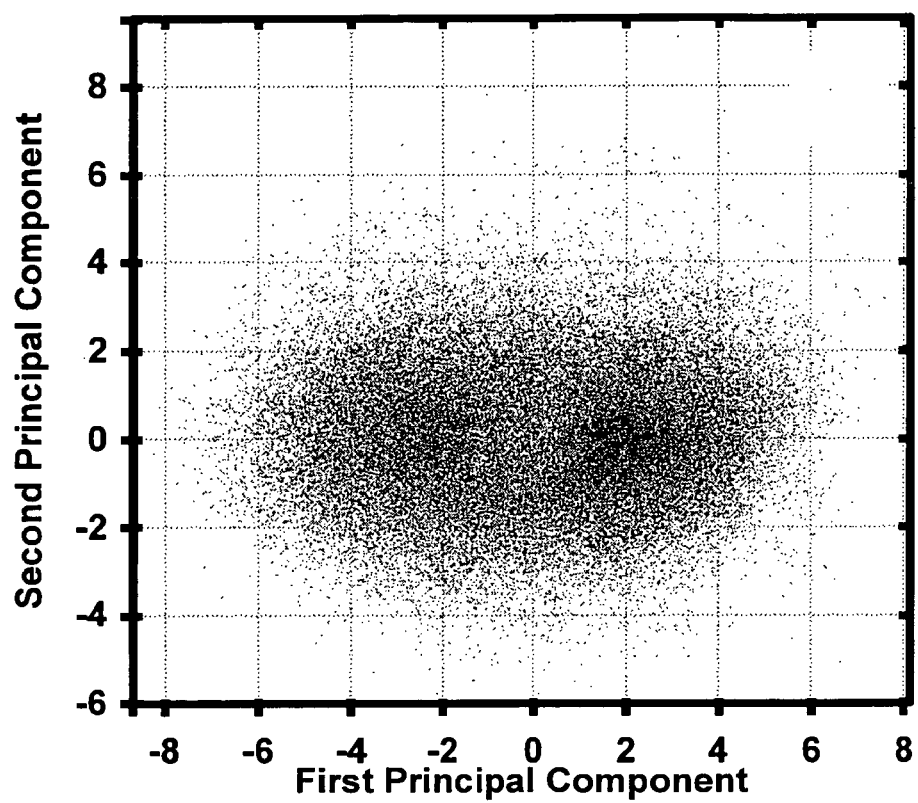
FIG. 7A is a graph showing a distribution of French words from a first principal component and second principal component.
Figure 7B:
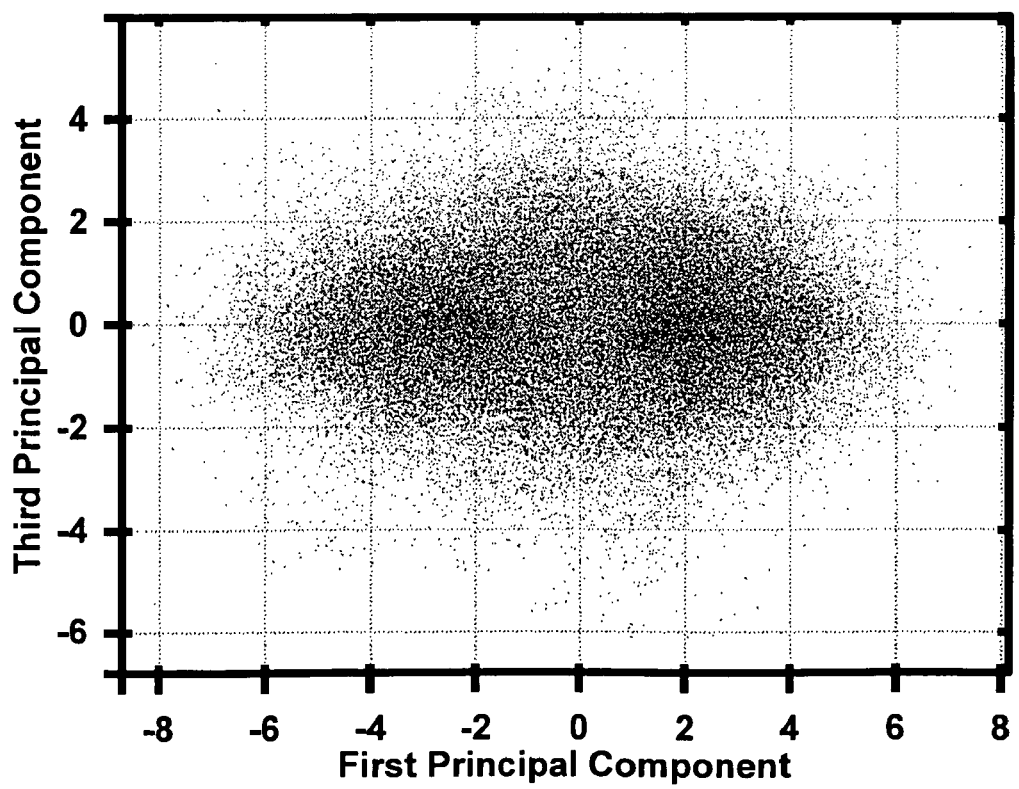
FIG. 7B is a graph showing a distribution of French words from a first principal component and a third principal component.
Figure 9:
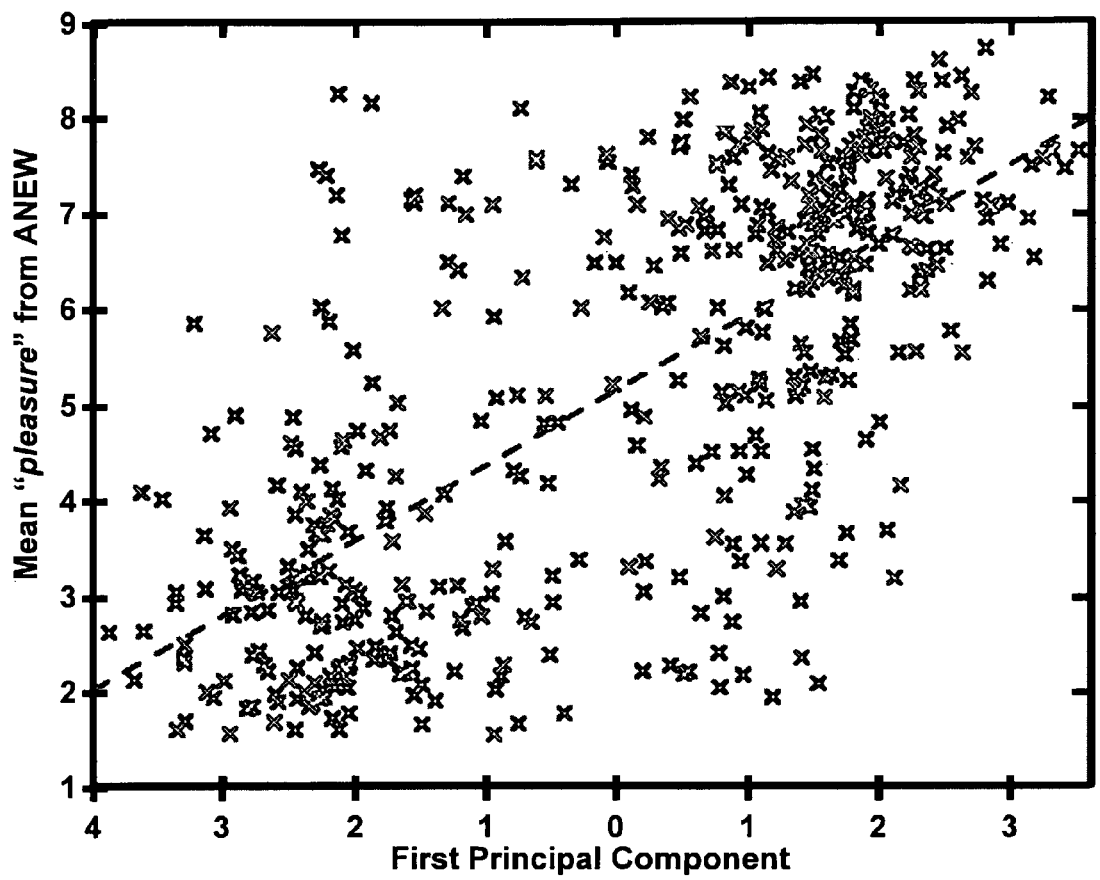
FIG. 9 is a scatter plot demonstrating strong correlation of principal component #1 with the first dimension of ANEW: pleasure.

FIG. 7A and 7B are graphs showing a final distribution of French words. The words come from the French core in its "ground state". The "banana shape" distribution resembles that of FIG. 5A. FIG. 7A is shows a distribution from a first principal component and second principal component. (PC #1 vs. PC #2). FIG. 7B shows a distribution from a first principal component and a third principal component. (PC #1 vs. PC #3). Like in the case of FIG. 5A, the distribution is bimodal with two clusters corresponding to positive and negative values (as found by examining the cluster elements).

FIG. 8 is a table showing top portions of sorted lists for each principal component: top three dimensions for two languages. Words that are common across cells within each row are underlined.

The shape of resultant distributions shown in FIG. 5A, FIG. 7A and FIG. 7B were found independent of the initial conditions and the realization of the stochastic noise $\eta$, which was sampled from a normal distribution. Interestingly, the geometric properties of shapes of the final distributions for the two languages are similar (cp. FIG. 5A and FIG. 7A): these are bimodal, "banana-shape" distributions, each exhibiting two dense clusters connected by a curved "neck", surrounded by a diffuse "fringe."

Another interesting detail is that the PC amplitude is quickly decaying with the PC number (FIG. 5 B and FIG. 6, left column), which may be a consequence of the fact that the matrix W is very sparse—or an indication that there are indeed very few cognitive dimensions in the corpus. Consistently with the first interpretation, the decay is slower, yet also very strong, for the French core (not shown here).

The findings of similarities in geometry extend to the semantics of distributions: The tables in FIG. 6 and FIG. 8 present the end-portions of sorted lists of words (words were sorted by their principal component scores). The table in FIG. 6 suggests that there are definite semantics associated with each of the first ten principal components: an intuitive impression that is difficult to quantify. The table in FIG. 8 was prepared as follows. After automated translation of the French sorted list, repetitions of words in the right column were removed, and then both lists within each row were truncated to an equal size. Observed semantic correlations are significant.

Main result: cross-language semantic consistency of the cognitive map structure

Each of the three top portions of paired lists shown in the table in FIG. 8 has at least three words in common with its counterpart. All words within each row have similar or closely related semantics. Semantic similarities within and across columns of the table seem to be at the same level of strength; however, an objective measure would be necessary to quantify this impression. How can one estimate the statistical significance of co-occurrence of the same words in top portions of two lists in each row of the table in FIG. 8? One way to estimate p-values from above. Given the size of the English core, and assuming that each French-to-English translation is a "blind shot" into the English core (null-hypothesis), estimate the probability to find one and the same word in top-twelve portions of both lists: $p \sim 2*12*12/8,236 = 0.035$ (the factor 2 is included because there are two possible ways of aligning the lists with respect to each other. The "top end" of each English list was in effect selected at random, but the "top end" of the counterpart French list was selected in order to match the semantics of the English list: here we had two possibilities and selected one of them, for each PC.). Therefore, the p-value of the case of word repetition that is seen in the table in FIG. 8 is smaller than 0.035, at least. In conclusion, significant correlations have been found among sorted lists across languages for each of the three principal components. It is also remarkable that there are no common words shared by any two rows in the table in FIG. 8.

Testing the constructed cognitive map: Synonym selection with a bias

The analysis so far was focused on extremities of the emergent cognitive maps. It is natural to ask whether words are organized consistently in the middle of a cognitive map. To address this question, a simple experiment was conducted. The algorithm was the following: (1) Select a word from the core: e.g., "problem"; (2) List all its synonyms; (3) Sort them along a given dimension: e.g., PC #1; and (4) Take one word from the top of the list and one word from the bottom. Below is an example of an outcome.

From the top: Problem→exercise.
From the bottom: Problem→obstacle.

Intuitively, the reader would probably agree that "exercise" is a more positive choice than "obstacle." For example, when a person is in a positive mood, they are more likely to take a new encountered problem as an exercise rather than an obstacle. This observation indicates that the cognitive map is consistently organized within itself. How can one quantify the consistency of its internal organization? This topic is addressed immediately below.

Analysis by comparison with psychometric data

In order to further validate the findings, principal dimensions found in the English core are compared against the dimensions of the ANEW dataset: "pleasure", "arousal" and "dominance." (In the ANEW dataset, the first dimension is called "pleasure", while in some studies based on ANEW it is called "valence"). The ANEW list contains 1,034 words, 479 of which were found in the English core. The scatter plot of PC #1 versus the first dimension of ANEW, which is the mean value of pleasure, is represented in FIG. 7. FIG. 7 is a scatter plot demonstrating strong correlation of principal component #1 with the first dimension of ANEW: pleasure. The dashed line is a linear fit. The plot shows strong correlation, with similar bimodal distributions in both PC #1 and the ANEW-pleasure dimensions. Pearson correlation coefficient $r=0.70$.

How can one match PCs with ANEW dimensions? The correlation analysis shows that PC #1 is the best match (i.e., most highly correlated among all PCs) for ANEW-pleasure, and vice versa ($r=0.70$, $p=10^{-70}$). PC #2 is the best match for ANEW-arousal ($r=0.32$, $p=10^{-12}$). Finally, ANEW-dominance among all ANEW dimensions is the best match for our PC #3 ($r=0.25$, $p=10^{-7}$); however, PC #1 and ANEW-dominance are correlated stronger ($r=0.64$).

Why do arousal and dominance have so low (albeit significant) correlations with the matching PCs? One possible answer is that semantics of ANEW-arousal and ANEW-dominance is different from the semantics of our PC #2 and PC #3. Indeed, in the given subset of 479 words that are common between the English core and ANEW, ANEW dimensions #1 ("pleasure") and #3 ("dominance") are strongly correlated ($r=0.86$). On the other hand, PC #1 and PC #3 are not strongly correlated ($r=0.13$), because PCs were calculated using principal component analysis (hence they could be expected to be independent). Debates continue in the literature as to whether "dominance" should be considered an independent dimension.

Discussion

In the present work, by applying a simple statistical-mechanic model to English and French dictionaries, multidimensional cognitive maps were constructed that capture the semantics of words. The principal dimensions of the resultant cognitive maps (the PCs) were calculated and their semantics consistent across two languages were found. The disclosed technique may be used to analyze other languages. For example, preliminary results of a similar study conducted with a Spanish dictionary of synonyms and antonyms (not reported here) support all the key findings described above, including semantics of the first three PCs.

The principal dimensions that were found appear to be approximately semantically consistent with the previously known dimensions ("affective dimensions" or "Osgood's dimensions") determined psychometrically, in experimental studies with human subjects that have revealed that "valence," "arousal" and "dominance" are the primary dimensions characterizing human values. In this context, it may not be a surprise to learn that modern theoretical models of emotions also use a similar or closely related set of principal dimensions. In the foregoing experimental studies, in contrast with the presently reported study, the initial choice of the set of dimensions, and according scoring concepts, was based on subjective reports or psychophysiological measures (SCR, HR, EEG, etc.). Using embodiments of the present invetion, it was shown that the same or similar dimensions can be found, and a cognitive map of human values can be constructed, without testing human subjects, but using linguistic corpora instead.

At the same time, the match between the PCs and ANEW dimensions labeled by words "arousal" and "dominance"

may not be perfect. It is surmised that semantics of the extracted dimensions cannot be characterized completely by a single word (e.g., "pleasure", "arousal", "dominance") or a pair of antonyms. One may need the entire cognitive map to define semantics of dimensions of this map precisely; however, an approximate definition could be based on a small set of antonym pairs, selected based on their map coordinates, degrees and frequencies.

Nevertheless, results of comparison with ANEW are surprising. There was no a priori reason to believe that ANEW-dimension #1 (pleasure) and ANEW-dimension #2 (arousal) should correspond to PC #1 and PC #2. The fact that they do show significant semantic correlations and make best matches with those counterparts is in and by itself intriguing and worth attention. It suggests that the linguistically derived cognitive map dimensions found in this study are not only language-invariant. They appear to be invariant at a broad scale of methodologies, across fields of science, and therefore they are likely to reflect fundamental aspects of human cognition. Extending this logic, one may expect similar results when the same method is applied to other representation systems: corpora, ontologies, databases and indices of various nature, as long as the notions of similarity and contrast can be defined for their elements.

The possibility to construct a complete cognitive map of natural language based on semantic differences and similarities among words opens many important questions. What is the number of independent dimensions of the conceptual value map? Which of the previous intuitively defined dimensions are orthogonal, and which would be represented as linear combinations of others? What is a canonical choice of a coordinate system, if this notion makes sense, and what would be the semantics of those special coordinates? Would all answers to the above questions be consistent across individuals, social groups, languages—or be individual-specific? Would they be extensible beyond human cognition: to robots and other forms of intelligence? Answering these questions may greatly benefit modern science and technology, because understanding the human value system and the degree of its logical necessity may be key to understanding the laws of cognitive explosion on Earth.

Viewing the findings of the present work in the context of cognitive architecture design, one can imagine an artificial cognitive system that learns new concepts and assigns values to them "on the fly": i.e., in the process of (unsupervised) learning. This may be possible, as soon as the system "knows" how to identify synonyms and antonyms of a new concept among familiar concepts that are already allocated on the cognitive map. Given this strategy, and assuming that the system is capable of cognitive growth, one may imagine as the system will gradually develop a personal system of higher values and ideals starting from primitive notions of reward and punishment. (Cognitive growth is understood in modern artificial intelligence as multi-level bootstrapped learning, starting from primitive knowledge and gradually developing higher abstract concepts and goals based on previously learned concepts). This capability could be vital for cognitive systems growing up in social embedding and intended to become human partners.

What else could cognitive maps be used for in a cognitive architecture? Here is an abridged list of their possible functions: filtering of search trees, finding analogies, satisfying semantic constraints, building systems of values for new domains of knowledge, bootstrapping development of higher values and goals, suggesting a reasonable commonsense initiative, classification of memories and strategic retrieval of episodic memories, guidance in imagery and decision making, etc. In addition, linguistic cognitive maps may find applications elsewhere: intuitive Internet search, etc.

In summary, the main finding of this work is the possibility to extract language-invariant dimensions of the human value system from linguistic corpora, using a statistical-mechanic approach. Similar results are expected with other representation systems and databases. The principles of map construction, as well as the map itself extracted from the human language may be used in a general-purpose self-aware cognitive architecture in order to enable its autonomous cognitive growth.

Alternative embodiments

Figure 10:
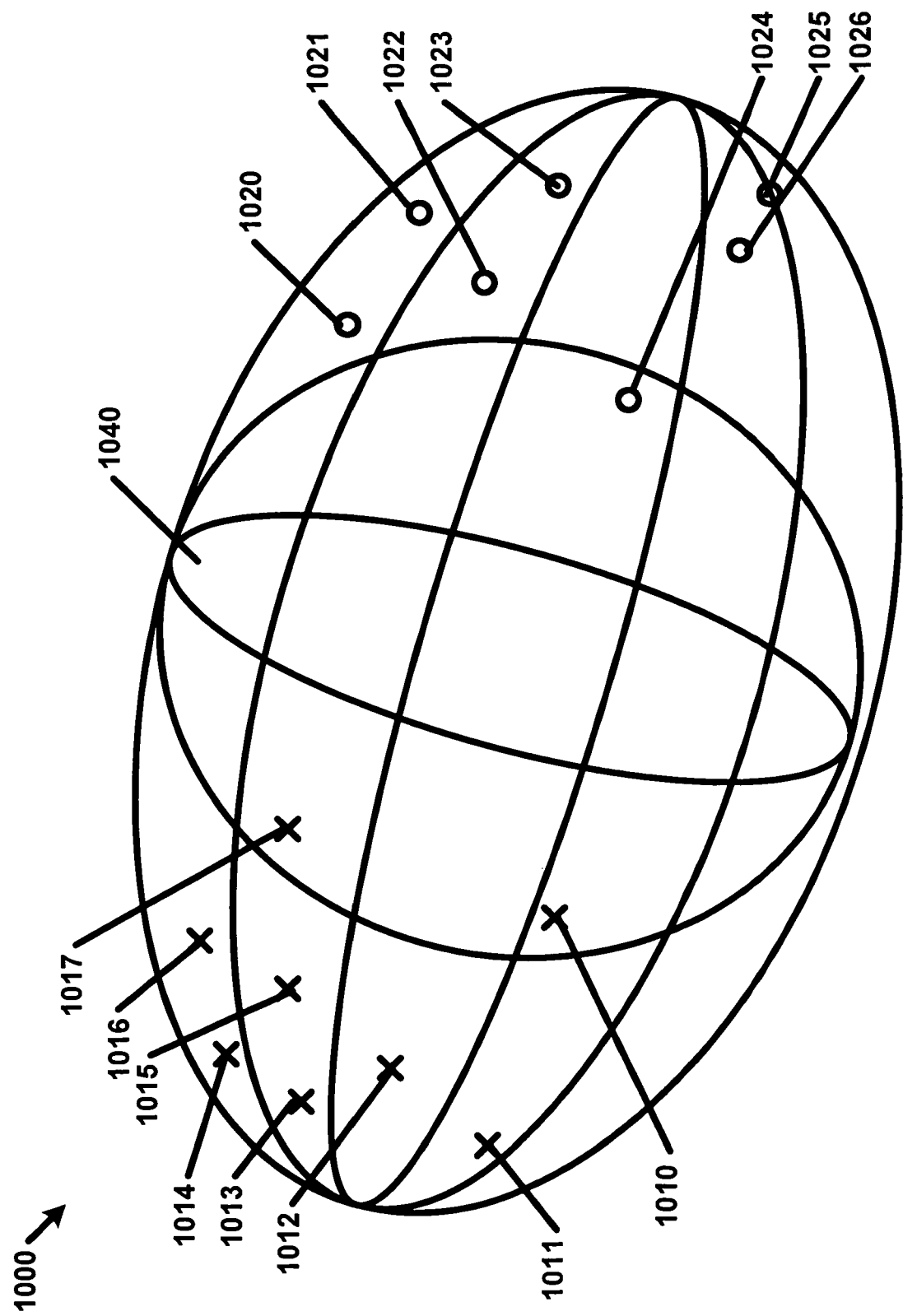
FIG. 10 is a diagram showing the general concept of a semantic cognitive map.

FIG. 10 is a diagram showing the general concept of a semantic cognitive map discussed herein. The symbolic representations of concepts (1010-1017 and 1020-1026) are allocated in an abstract vector space 1040 that captures their semantics. As shown in this illustrative example, 1013 and 1015 are synonyms; 1013 and 1023 are antonyms. The metric space may be represented in numerous ways such as a Euclidian multidimensional space; a sphere; a torus; a ball; or some combination thereof. For example, the metric space could be represented as a ten dimensional Euclidian space.

The semantic cognitive map 1000 comprises a representation of a metric space 1040 and a multitude of points (1010-1017 and 1020-1026). Each of the multitude of points (1010-1017 and 1020-1026) may represent a dictionary entry and should have a location in the metric space 1040.

Figure 11:
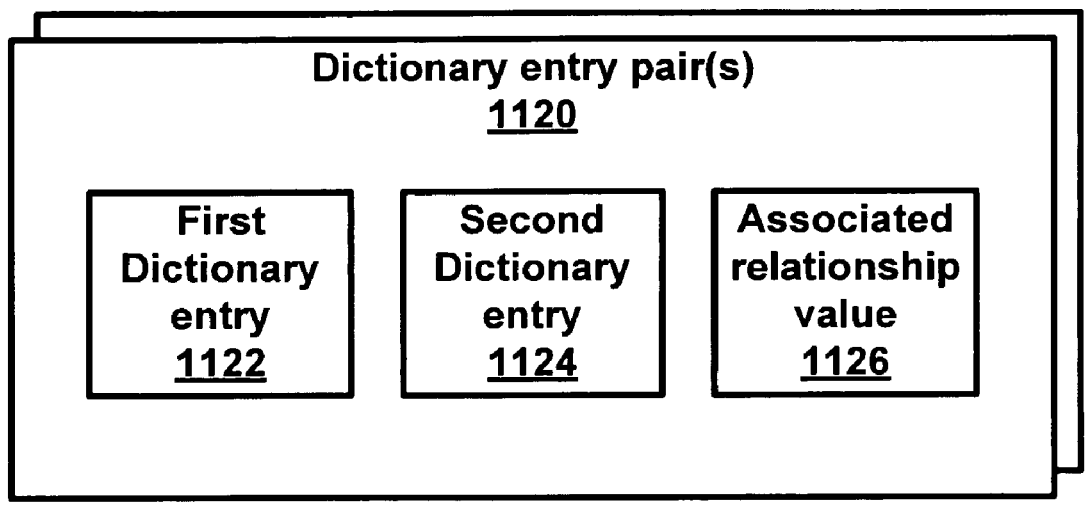
FIG. 11 is a block diagram of dictionary entry pair(s) as per an aspect of an embodiment of the present invention.

Dictionary entries may be associated with at least one onym. Examples of onyms include a synonyms and antonyms. This association may be explicitly recorded using dictionary entry pair(s) 1120 of dictionary entries (1122 and 1124) with an associated relationship value 1126 as shown in FIG. 11B. The value of the associated relationship value 1126 should indicate the relationship of the two dictionary entries (1122 and 1124). For example, if the two dictionary entries (1122 and 1124) are synonyms, the associated relationship value 1126 could be given a value of +1. If however, the two dictionary entries (1122 and 1124) are anotonyms, the associated relationship value 1126 could be given a value of −1. Values in between +1 and −1 may be used to indicate the relative strength of the onym relationship.

The location of the point in the metric space may be defined by a global minimum of an energy function of the multitude of points (1010-1017 and 1020-1026). The global minimum may be determined using commercially available optimization functions such as Matlab's optimization toolbox or custom written software functions. A gradiant method, or a Newton method may be used. They may be selected based on the specifics of the implementation.

The energy function may be defined so that for any pair of the multitude of points (1010-1017 and 1020-1026), the distance between the points is a measure of the semantic dissimilarity between the dictionary entries associated with the two points. If words are represented by D-dimensional vectors, then it is expected that vectors of two synonyms will have a positive dot product, while vectors of two antonyms will have a negative dot product. Based on this idea, the energy function H (*) of the system of vectors can be defined as follows. Given a dictionary of words and phrases and an incidence matrix of their synonym-antonym relations, for each pair of antonyms, the dot product of the corresponding vectors may be added to H, and for each pair of synonyms, the dot product of the corresponding vectors may be subtracted from H. The last term in H may be the sum of fourth powers of all vector length:

$$H = \sum_A xy - \sum_S xy + \frac{1}{4}\sum_x x^4 \qquad (*)$$

Here x and y are D-vectors representing words, A is the set of antonym pairs, and S is the set of synonym pairs. The last term reflects the idea that the map should be compact.

Given this definition, a cognitive map may be constructed by numerical minimization of H with respect to all vector coordinates, starting from some random set of coordinates. When the minimization is completed, the choice of map coordinates may be selected based on the principal components (PCs) of the final distribution.

Other energy functions such as $$H(x) = -\frac{1}{2}\sum_{i,j=1}^{N} W_{ij}(x_i, x_j) + \frac{1}{4}\sum_{i=1}^{N}|x_i|^2,$$

$x_i = (x_{i,1} \ldots x_{i,D})$ may be defined and used. For example, the energy function may be defined so that spatial dimensions of the multitude of points (1010-1017 and 1020-1026) reveal principal semantic dimensions of a dictionary. Additionally, the energy function may be defined so that the first point and the second point take opposing positions along the spatial dimension that characterizes the semantic relationship between the between the dictionary entry associated with the first point and the dictionary entry associated with the second point when the dictionary entry associated with the first point is an antonym of the dictionary entry associated with the second point.

The data points may be stored on a computer readable media and represented in numerous ways, such as on a multi-dimensional display or on a 2-D format such as a computer monitor or a two dimensional piece of paper.

New points may be associated with a new dictionary entry and positioned on the semantic cognitive map 1000 using an onym associated with the new dictionary entry.

The dictionary entries could also include other types of values other than just individual words. Example of other types of dictionary entries may include: natural language words; groups of words; sentences; discourses; clauses; phrases; concepts; values; semantic values; web pages; bibliographic entries; objects; a database entries; geographic characteristics; episodic memory; analogies; feelings; memory locations; and categories.

Figure 12:
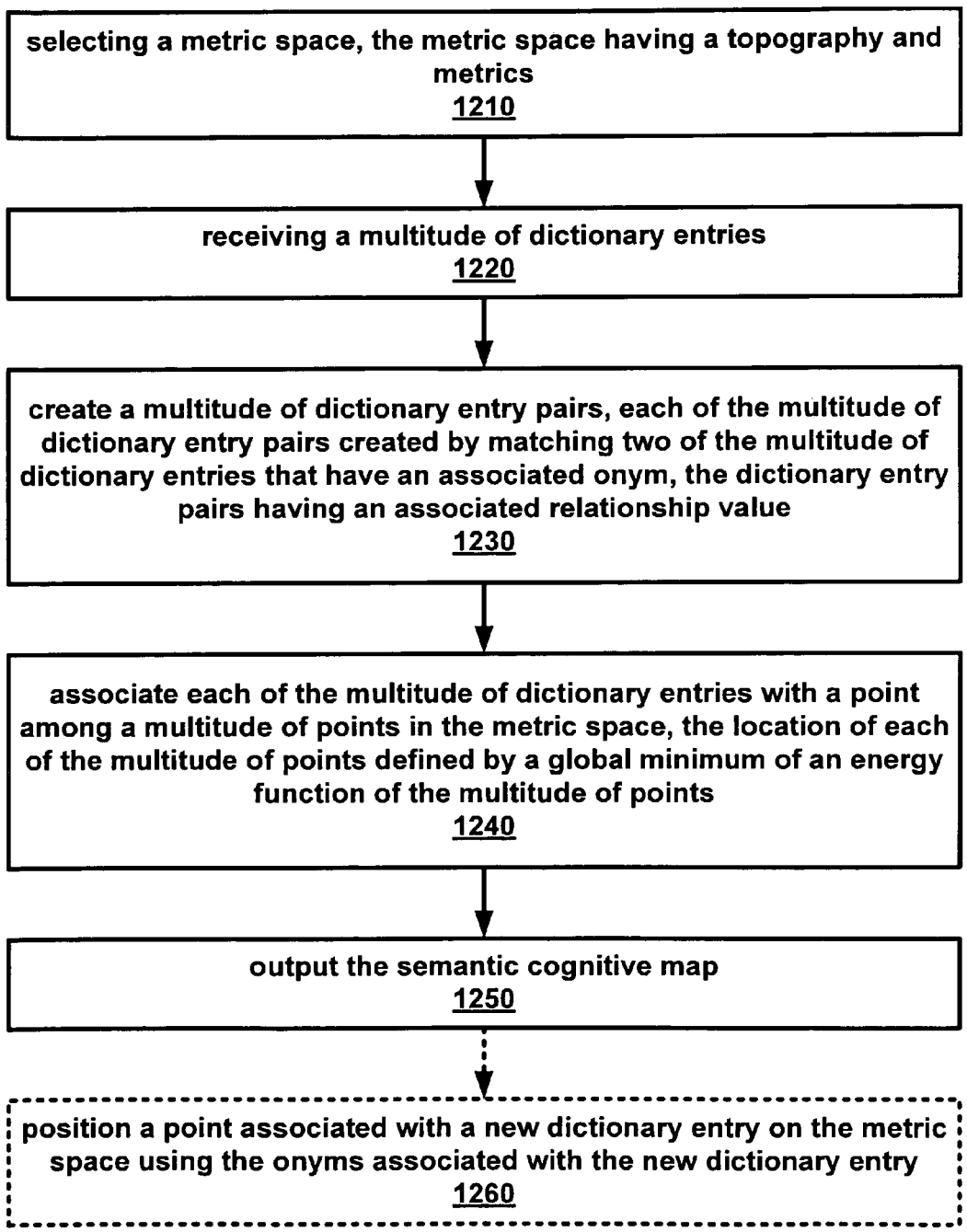
FIG. 12 is a flow diagram of a computer implemented method for generating a semantic cognitive map as per an aspect of an embodiment of the present invention.

FIG. 12 is a flow diagram of a computer implemented technique for generating a semantic cognitive map 1000 as per an aspect of an embodiment of the present invention. The technique for generating the semantic cognitive map 1000 includes: selecting a metric space 1040 at 1210, receiving a multitude of dictionary entries at 1220, creating a multitude of dictionary entry pairs at 1230, and outputting the semantic cognitive map 1000 at 1250. The metric space 1040 should have a topology and metrics (distance between two points). Each of the dictionary entries should be associated with at least one onym. Onyms include synonyms and antonyms.

Each of the multitude of dictionary entry pairs 1120 may be created by matching two of the multitude of dictionary entries that have an associated onym with an associated relationship value 1126. The associated relationship value 1126 may have a value defining the onym relationship between the two dictionary entries. For example, associated relationship value 1126 could have a synonym value if the matched dictionary entries are synonyms; and an antonym value if the matched dictionary entries are antonyms. A synonym value could be a positive value (e.g. +1) while an antonym value could be a negative value (e.g. −1).

The semantic cognitive map 1000 may be created by associating each of the multitude of dictionary entries with a point among a multitude of points (1010-1017 and 1020-1026) in the metric space 1040. The location of each of the multitude of points (1010-1017 and 1020-1026) may be defined by a global minimum of an energy function of the multitude of points (1010-1017 and 1020-1026). The energy function may be defined so that the semantic cognitive map has the following properties: (1) for any pair of the multitude of points (1010-1017 and 1020-1026), the pair including a first point and a second point, the distance between the first point and the second point is a measure of the semantic dissimilarity between the dictionary entry associated with the first point and the dictionary entry associated with the second point; (2) spatial dimensions of the semantic cognitive map reveal principal semantic dimensions for the dictionary; and (3) the first point and the second point take opposing positions along the spatial dimension that characterizes the semantic relationship between the between the dictionary entry associated with the first point and the dictionary entry associated with the second point when the dictionary entry associated with the first point is an antonym of the dictionary entry associated with the second point. The energy function may also include the dot product of the vector of the location of the multitude of points (1010-1017 and 1020-1026).

At 1250, the semantic cognitive map 1000 may be outputted. The semantic cognitive map 1000 should now represent a continuum of semantics exemplified by the locations of the multitude of points (1010-1017 and 1020-1026) associated with the multitude of dictionary entries in the metric space 1040. The output may be interactive or not.

Once the cognitive semantic map 1000 is created, new dictionary entries may be positioned into the metric space 1040 using the onyms associated with the new dictionary entry at 1260. Similarly, one could traverse the multitude of points (1010-1017 and 1020-1026) while locating a point associated with a new dictionary entry.

In broader terms, a semantic cognitive map may be generated by associating each of a multitude of dictionary entries with a point among a multitude of points (1010-1017 and 1020-1026) in a metric space 1040. Each of the dictionary entries is preferably associated with at least one onym such as a synonym or antonym. The metric space 1040 should have a topology and metrics so that the location of each of the multitude of points (1010-1017 and 1020-1026) may defined by a global minimum of an energy function of the multitude of points (1010-1017 and 1020-1026).

The energy function may be defined so that for any pair of the multitude of points (1010-1017 and 1020-1026), the pair including a first point and a second point, the distance between the first point and the second point is a measure of the semantic dissimilarity between the dictionary entry associated with the first point and the dictionary entry associated with the second point. The energy function may also be defined so that spatial dimensions of the multitude of points (1010-1017 and 1020-1026) reveal principal semantic dimensions of a dictionary, the dictionary including the multitude of dictionary entries. In addition, the energy function may be defined so that any pair of the multitude of points (1010-1017 and 1020-1026), the pair including a first point and a second point, the first point and the second point take opposing positions along the spatial dimension that characterizes the semantic relationship between the between the dictionary entry associated with the first point and the dictionary entry associated with the second point when the dictionary entry associated with the first point is an antonym of the dictionary entry associated with the second point.

Figure 13:
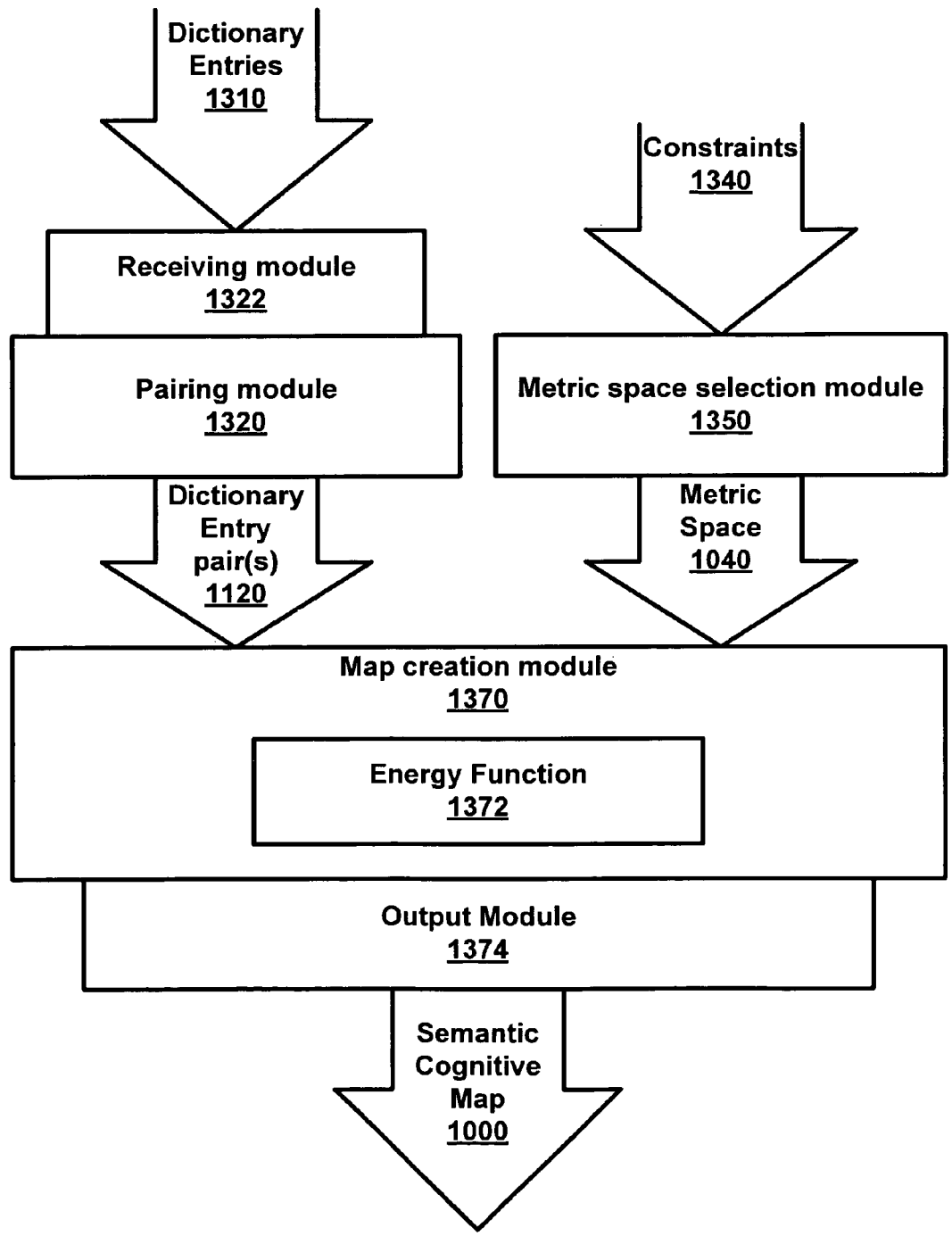
FIG. 13 is a block diagram of a system for generating a semantic cognitive map as per an aspect of an embodiment of the present invention.

FIG. 13 is a block diagram of a system for generating a semantic cognitive map as per an aspect of an embodiment of the present invention. The system includes receiving module 1322, a metric space selection module 1350, a pairing module 1320, a map creation module 1370, and an output module 1374. The metric space selection module 1350 may be configured to select a metric space 1040 that has a topology and metrics within a set of predetermined constraints 1340. The receiving module 1322 is preferably configured to receive a multitude of dictionary entries 1310 that are each associated with at least one onym such as a synonym or an antonym.

The pairing module 1320 may be configured to create a multitude of dictionary entry pairs 1120 by matching pairs of the multitude of dictionary entries 1310 that have an associated onym. The dictionary entry pairs 1120 may have an associated relationship value 1126 that includes a synonym value if the matched dictionary entries are synonyms and an antonym value if the matched dictionary entries are antonyms.

The map creation module 1370 may be configured to create a semantic cognitive map 1000 by associating each of the multitude of dictionary entries 1310 with a point among a multitude of points (1010-1017 and 1020-1026) in the metric space 1040. The location of each of the multitude of points (1010-1017 and 1020-1026) defined by a global minimum of an energy function 1372 of the multitude of points (1010-1017 and 1020-1026). The energy function may be defined so that the semantic cognitive map has the following properties: (1) for any pair of the multitude of points (1010-1017 and 1020-1026), the pair including a first point and a second point, the distance between the first point and the second point is a measure of the semantic dissimilarity between the dictionary entry associated with the first point and the dictionary entry associated with the second point; (2) spatial dimensions of the semantic cognitive map reveal principal semantic dimensions for the dictionary; and (3) the first point and the second point take opposing positions along the spatial dimension that characterizes the semantic relationship between the between the dictionary entry associated with the first point and the dictionary entry associated with the second point when the dictionary entry associated with the first point is an antonym of the dictionary entry associated with the second point.

The output module is preferably configured to output the semantic cognitive map 1000 so that it may be used by other applications such as a semantic web searching engine, a thesaurus, a test mood sensor, etc. The semantic cognitive map 1000 should be a continuum of semantics exemplified by the locations of the multitude of points (1010-1017 and 1020-1026) associated with the multitude of dictionary entries in the metric space 1040.

Figure 14:
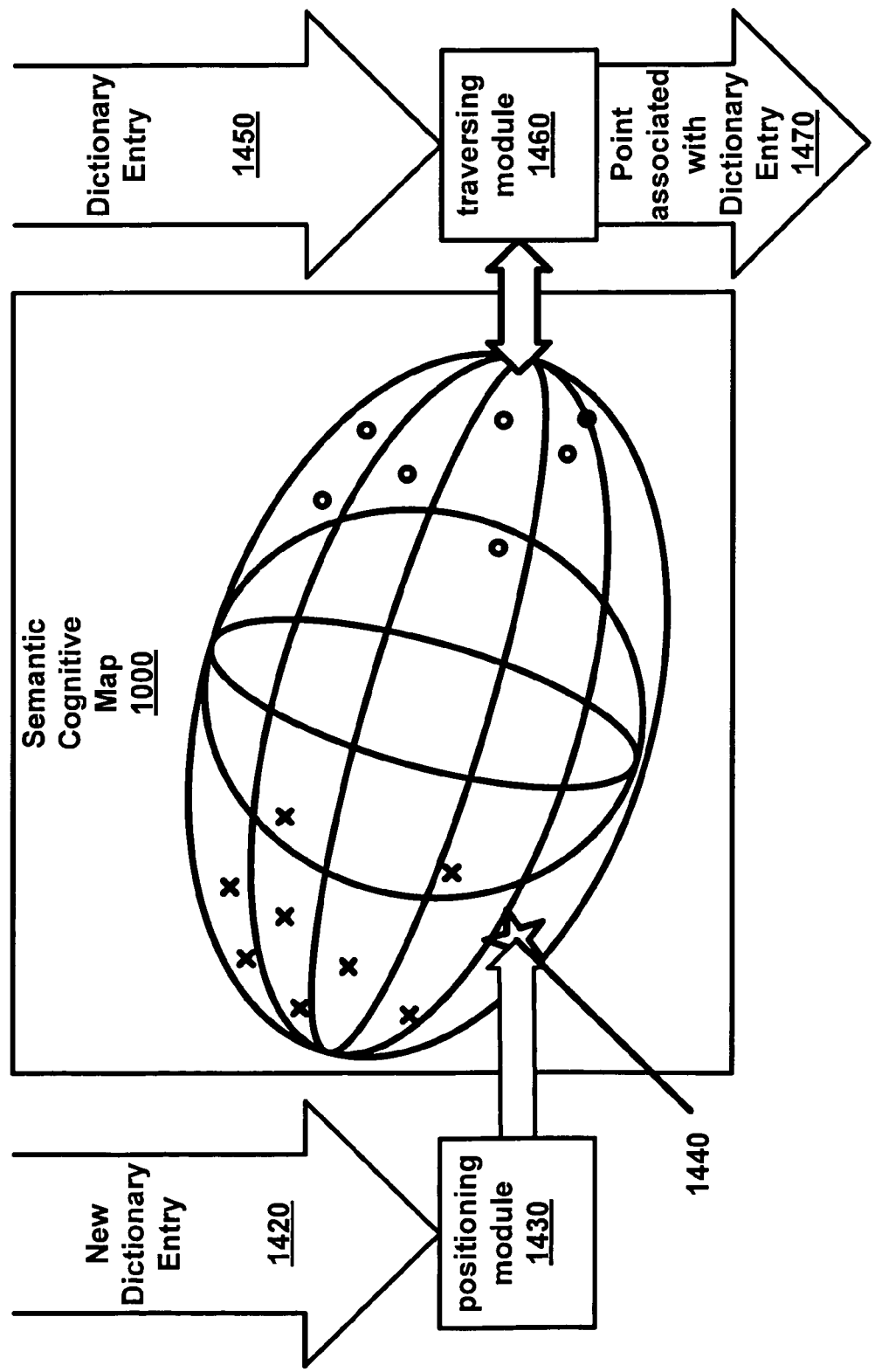
FIG. 14 is a block diagram showing points being positioned and located within a semantic cognitive map as per an aspect of an embodiment of the present invention.

FIG. 14 is a block diagram showing points being positioned and located within a semantic cognitive map as per an aspect of an embodiment of the present invention. Positioning module 1430 maybe configured to position 1440 a new dictionary entry 1420 onto a semantic map 1000 using onym information for that new dictionary entry 1420. Similarly, traversing module 1460 may be configured to traverse the multitude of points (1010-1017 and 1020-1026) on a semantic cognitive map to locate a point(s) 1470 associated with a dictionary entry 1450.

The Map Semantics

Given the consistency of findings, the question is: How to identify the observed semantics? The answer is given by coordinates of all words on the map, and there are several possibilities to express it concisely in terms of familiar notions. One is to look at the top or the bottom portions of sorted lists of words (See FIG. 8). Another possibility is to design and then validate a logical expression that captures semantics of principal components, treating words as predicates. For example, the following is a candidate:

PC#1 =success|positive|clear|makes-good-sense

PC#2 =exciting|sophisticated|does-not-go-easy

An alternative approach is to treat the constructed map and its principal components as definitions of new semantic concepts, called "First Subjective Dimension", "Second Subjective Dimension", etc., without attempting to reduce these concepts to a few familiar words or concise definitions based on words. The idea is that these concepts may not be exactly reducible and therefore should not be reduced and replaced with something familiar. These new semantic concepts can be learned by exploration of the map on a case-by-case basis, in analogy with learning natural language. Similarly, the abstract linear unit of the map can be called linear semantic unit (LSU: FIG. 5).

In order to validate this approach, the following method was used in a pilot study. Random 200 dictionary words were presented to a human participant (one of the authors), and, based on the previous experience obtained during exploration of the map, the participant made a forced decision (without looking at the actual word coordinates) what should be the coordinates of presented words along the First Semantic Dimension. The computed correlation of the subjectively decided coordinate with the actual map coordinate is significantly high (Pearson's correlation coefficient $r=0.7$), indicating that the notion of the First Semantic Dimension is unambiguous, can be learned and subsequently used in analysis and processing of linguistic data. Confirmation of these preliminary results with multiple participants would indicate that this notion of First Semantic Dimension can be reliably used in computational measurement of semantics, for communications, etc. Another validation of semantic cognitive map constructed from the MS Word English dictionary was discussed earlier using the ANEW database (See FIG. 9).

Application of Semantic Cognitive Map: Mood Sensing from text

The semantic cognitive map constructed from MS Word English dictionary may be used to compute semantic preferences expressed in a given text, or to make decision about the mood of a given document. In order to illustrate this possibility, here the semantic cognitive map was used to classify a set of abstracts retrieved from Medline by a search for "neur*" (the search result was truncated at 500). Words from each abstract were located on the semantic cognitive map, and the average vector (the "center of mass") of all indexed words was computed for each abstract. This is how each abstract was assigned map coordinates. Finally, the set of abstracts was sorted along the first two principal components. The table in FIG. 16 gives the first two sentences of each of the four "extreme" abstracts.

In order to further validate this method, a set of arbitrarily generated utterances was used. The utterances were intentionally generated with the purpose to cover the entire spectrum of feelings represented by the first two map coordinates, based on a prior experience with exploration of the map and intuitive expectations of the results. These utterances are:

Please, chill out and be quiet. I am bored and want you to relax. Sit back and listen to me.

Excuse me, sorry, but I cannot follow you and am falling asleep. Can we pause? I've got tired and need a break.

I hate you, stupid idiot! You irritate me! Get disappeared, or I will hit you!

What you are telling me is terrible. I am very upset and curious: what's next?

Wow, this is really exciting! You are very smart and brilliant, aren't you?

I like very much every word that you say. Please, please, continue. I feel like I am falling in love with you.

We have finally found the solution. It looks easy after we found it. I feel completely satisfied and free to go home.

Figure 15:
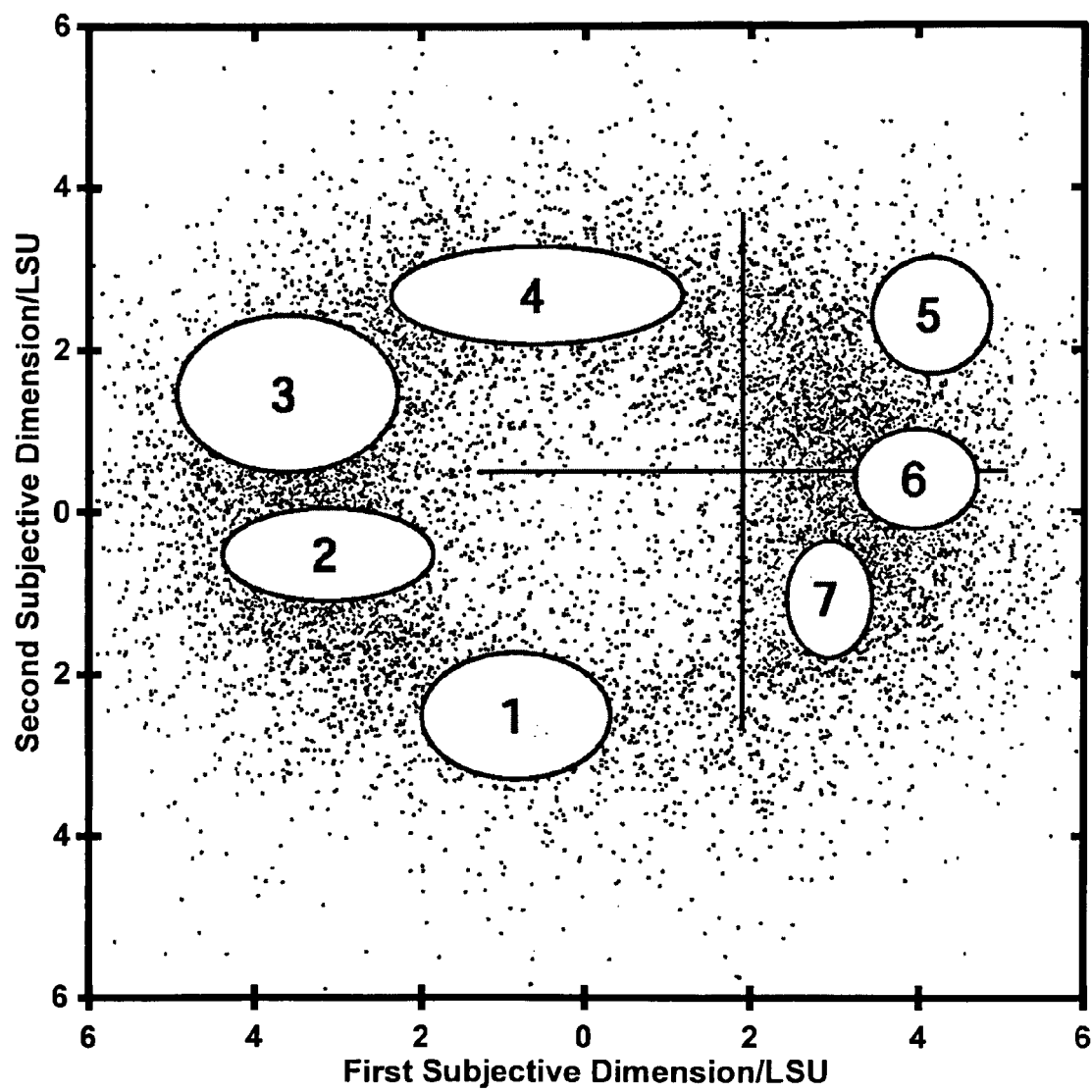
FIG. 15 is a Cognitive map of English with seven utterances automatically allocated on it.

The results of automated allocation of these utterances on the semantic cognitive map are represented in FIG. 15. The plane of the figure corresponds to the first two semantic coordinates, labeled here "First Subjective Dimension" and "Second Subjective Dimension", respectively. The fuzzy annulus of grey dots in the background are the dictionary words allocated on the map (same as in FIG. 5A). The center of the cross in the middle, shifted to the right, represents the average of all word vectors weighted by the general frequency of usage of words. The shaded ovals represent estimates of feelings associated with the given sample: the center of an oval is the estimate, and the dimensions of each oval represent the standard error. Ovals are numbered according to the numbers of utterances in the list above. The significant dimensionality of the sample is equal 2 (calculated by MANOVA, $P<0.003$).

A similar mapping study was performed with other samples of text: (i) a set of 500 Medline abstracts, as described above, (ii) the set of 152 Shakespeare sonnets, (iii) a set of 10 abstracts of accepted grants, (iv) a set of 45 anecdotes about famous personalities. All results show qualitative consistency with each other.

This application discloses a cognitive mapping technique introduces new, universal computational semantic measures that apply to natural language. These measures in principle can be validated and used for many purposes, e.g., for automated detection of mood and semantic preferences expressed in an arbitrary coherent text segment, thus opening new perspectives for NLP related to human-computer interface and data mining.

In a broader artificial intelligence context, semantic cognitive maps similar to the one constructed here can be used to give human-like "feelings" and "affects" to artifacts. For example, suppose that a dynamical working memory state of an agent is characterized by a set of active symbolic representations, each of which is associated with a word or a phrase from natural language. Then, the method described here can be used to compute the current mood of the agent based on the set of words associated with its current state.

In general, in order to achieve a human level of emotional intelligence in an artifact, it may be necessary to use a semantic cognitive map derived from the entire human culture. The present disclosed embodiments demonstrated a possibility to define universal, computable semantic characteristics that can provide a basis for the autonomous development of a system of values in the future artificial cognitive systems Many of the elements described in the disclosed embodiments may be implemented as modules. A module is defined here as an isolatable element that performs a defined function and has a defined interface to other elements. The modules described in this disclosure may be implemented in hardware, software, firmware, wetware (i.e hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by the law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A non-transitory computer readable media comprising instructions configured to cause one or more processors to execute a implemented method for generating a semantic cognitive map, the method comprising:

a. selecting a metric space, the metric space having a topology and metrics;

b. receiving a multitude of dictionary entries, each of the dictionary entries associated with at least one onym, the at least one onym including at least one of the following:
  i. a synonym; or
  ii. an antonym;
c. creating a multitude of dictionary entry pairs, each of the multitude of dictionary entry pairs created by matching two of the multitude of dictionary entries that have an associated onym, the dictionary entry pairs having an associated relationship value, the relationship value having a:
  i. synonym value if the matched dictionary entries are synonyms; and
  ii. an antonym value if the matched dictionary entries are antonyms;
d. creating a semantic cognitive map by associating each of the multitude of dictionary entries with a point among a multitude of points in the metric space, the location of each of the multitude of points defined by a global minimum of an energy function of the multitude of points, the energy function defined so that the semantic cognitive map has the following properties:
  i. for any pair of the multitude of points, the pair including a first point and a second point, the distance between the first point and the second point is a measure of the semantic dissimilarity between the dictionary entry associated with the first point and the dictionary entry associated with the second point;
  ii. spatial dimensions of the semantic cognitive map reveal principal semantic dimensions for the dictionary; and
  iii. the first point and the second point take opposing positions along the spatial dimension that characterizes the semantic relationship between the dictionary entry associated with the first point and the dictionary entry associated with the second point when the dictionary entry associated with the first point is an antonym of the dictionary entry associated with the second point; and
e. outputting the semantic cognitive map, the semantic cognitive map being a continuum of semantics exemplified by the locations of the multitude of points associated with the multitude of dictionary entries in the metric space.

2. The media according to claim 1, wherein:
a. the metric space includes a ten dimensional Euclidian space; and
b. the energy function is:

$$H(x) = -\frac{1}{2}\sum_{i,j=1}^{N} W_{ij}(x_i, x_j) + \frac{1}{4}\sum_{i=1}^{N} |x_i|^2,$$

$$x_i = (x_{i,1} \ldots x_{i,D}).$$

3. A non-transitory computer readable media comprising instructions configured to cause one or more processors to execute a method for generating a semantic cognitive map, the method comprising: creating a semantic cognitive map by associating each of a multitude of dictionary entries with a point among a multitude of points in a metric space, each of the dictionary entries associated with at least one onym, the at least one onym including at least one synonym or antonym, the metric space having a topology and metrics, the location of each of the multitude of points defined by a global minimum of an energy function of the multitude of points.

4. The media according to claim 3, wherein the energy function is defined so that for any pair of the multitude of points, the pair including a first point and a second point, the distance between the first point and the second point is a measure of the semantic dissimilarity between the dictionary entry associated with the first point and the dictionary entry associated with the second point.

5. The media according to claim 3, wherein the energy function is defined so that spatial dimensions of the multitude of points reveal principal semantic dimensions of a dictionary, the dictionary including the multitude of dictionary entries.

6. The media according to claim 3, wherein the energy function is defined so that any pair of the multitude of points, the pair including a first point and a second point, the first point and the second point take opposing positions along the spatial dimension that characterizes the semantic relationship between the between the dictionary entry associated with the first point and the dictionary entry associated with the second point when the dictionary entry associated with the first point is an antonym of the dictionary entry associated with the second point.

7. The media according to claim 3, wherein the dictionary entry pairs have an associated relationship value, the relationship value having a:
  a. synonym value if the matched dictionary entries are synonyms; and
  b. an antonym value if the matched dictionary entries are antonyms.

8. The media according to claim 7, wherein the synonym value is positive and the antonym value is negative.

9. The media according to claim 3, further including positioning a point associated with a new dictionary entry on the metric space using at least one onym associated with the new dictionary entry.

10. The media according to claim 3, wherein the energy function includes the dot product of the vector of the location of the multitude of points.

11. The media according to claim 3, wherein the metric space includes at least one of the following:
  a. Euclidian multidimensional space;
  b. a sphere;
  c. a torus;
  d. a ball; or
  e. or a combination of the above.

12. The media according to claim 3, wherein the dictionary entries include at least one of the following:
  a. a word;
  b. a natural language word;
  c. a groups of words;
  d. a sentence;
  e. a discourse;
  f. a clause;
  g. a phrase;
  h. a concept;
  i. a value;
  j. a semantic value;
  k. a web page;
  l. a bibliographic entry;
  m. an object;
  n. a database entry;
  o. a geographic characteristic;
  p. episodic memory
  q. an analogy;
  r. a feeling;
  s. a memory location;
  t. a category; or
  u. a combination of the above.

13. The media according to claim 3, further including traversing the multitude of points while locating a point associated with a new dictionary entry.

14. A non-transitory computer readable media comprising a computer generated semantic cognitive map configured to be employed by one or more processors, the computer generated semantic cognitive map comprising:
 a. a representation of a metric space;
 b. a multitude of points, each of the multitude of points:
  i. representing one of a multitude of dictionary entries, at least some of the dictionary entries associated with at least one onym, the at least one onym including at least one of the following:
   1. a synonym; or
   2. an antonym; and
  ii. having a location in the metric space, the location defined by a global minimum of an energy function of the multitude of points; and
  wherein the energy function is defined so that for any pair of the multitude of points, the pair including a first point and a second point, the distance between the first point and the second point is a measure of the semantic dissimilarity between the dictionary entry associated with the first point and the dictionary entry associated with the second point.

15. The computer generated semantic cognitive map according to claim 14, wherein the dictionary entries include at least one of the following:
 a. a word;
 b. a natural language word;
 c. a groups of words;
 d. a sentence;
 e. a discourse;
 f. a clause;
 g. a phrase;
 h. a concept;
 i. a value;
 j. a semantic value;
 k. a web page;
 l. a bibliographic entry;
 m. an object;
 n. a database entry;
 o. a geographic characteristic;
 P. episodic memory
 q. an analogy;
 r. a feeling;
 s. a memory location;
 t. a category; or
 u. a combination of the above.

16. A system for generating a semantic cognitive map, the system comprising:
 a. a metric space selection module configured to select a metric space having a topology and metrics;
 b. a receiving module configured to receive a multitude of dictionary entries, each of the dictionary entries associated with at least one onym, the at least one onym including at least one of the following:
  i. a synonym; or
  ii. an antonym;
 c. a pairing module configured to create a multitude of dictionary entry pairs, each of the multitude of dictionary entry pairs created by matching two of the multitude of dictionary entries that have an associated onym, the dictionary entry pairs having an associated relationship value, the relationship value having a:
  i. synonym value if the matched dictionary entries are synonyms; and
  ii. an antonym value if the matched dictionary entries are antonyms;
 d. a map creation module configured to employ one or more processors to create a semantic cognitive map by associating each of the multitude of dictionary entries with a point among a multitude of points in the metric space, the location of each of the multitude of points defined by a global minimum of an energy function of the multitude of points, the energy function defined so that the semantic cognitive map has the following properties:
  i. for any pair of the multitude of points, the pair including a first point and a second point, the distance between the first point and the second point is a measure of the semantic dissimilarity between the dictionary entry associated with the first point and the dictionary entry associated with the second point;
  ii. spatial dimensions of the semantic cognitive map reveal principal semantic dimensions for the dictionary; and
  iii. the first point and the second point take opposing positions along the spatial dimension that characterizes the semantic relationship between the between the dictionary entry associated with the first point and the dictionary entry associated with the second point when the dictionary entry associated with the first point is an antonym of the dictionary entry associated with the second point; and
 e. an output module configured to output the semantic cognitive map, the semantic cognitive map being a continuum of semantics exemplified by the locations of the multitude of points associated with the multitude of dictionary entries in the metric space.

17. The system according to claim 16, wherein the synonym value is positive and the antonym value is negative.

18. The system according to claim 16, further including a positioning module configured to position a point associated with a new dictionary entry on the metric space using the onyms associated with the new dictionary entry.

19. The system according to claim 16, wherein the energy function includes the dot product of the vector of the location of the multitude of points.

20. The system according to claim 16, wherein the metric space includes at least one of the following:
 a. Euclidian multidimensional space;
 b. a sphere;
 c. a torus;
 d. a ball; or
 e. a combination of the above.

21. The system according to claim 16, wherein further at traversing module configured to traverse the multitude of points while locating a point associated with a dictionary entry.

* * * * *